Patented Mar. 11, 1941

2,234,615

UNITED STATES PATENT OFFICE 2,234,615

PLASTICIZER

Claude H. Alexander, Cuyahoga Falls, Ohio, assignor to The B. F. Goodrich Company, New York, N. Y., a corporation of New York No Drawing. Application January 27, 1938,
Serial No. 187,223

10 Claims. (Cl. 260—36)

This invention relates to plasticizers and to polyvinyl halide compositions containing them, and has as its principal object to provide plasticizers which will produce compositions having desirable properties as hereinafter described.

Polyvinyl halides have found many useful applications because of their extraordinary resistance to oxidation, organic solvents, acids, alkalies, and other deteriorating influences. Polyvinyl halides are frequently plasticized to render them less brittle and more easily workable. Plasticizers are also used in lacquers and paints containing polyvinyl halides to impart the desired flexibility to films formed therefrom. Any type of polyvinyl halide such as alpha, beta, delta, and gamma polyvinyl chloride, polyvinyl bromide, or even polyvinyl halide compositions formed by the conjoint polymerization of a vinyl halide such as vinyl chloride and a vinyl ester of an aliphatic acid such as vinyl acetate may be combined with plasticizers. When plasticizers are incorporated in gamma polyvinyl chloride, however, resilient, rubber-like compositions are formed. Since the plasticized gamma polyvinyl chlorides, which are described in U. S. Patent 1,929,453 issued to Waldo L. Semon, show the greatest promise, the invention will be described in detail with reference to these compositions, though it is to be understood that the invention is equally applicable to other polyvinyl halides as set forth above.

The most commonly used plasticizers are esters, ketones, and ethers, the term "ether" being used in a generic sense to designate both oxygen- and thio-ethers. In the plasticizer art, these three kinds of compounds perform the same functions, and are generally recognized as belonging to one generic class. There are many esters, ketones, and ethers, however, which are unsatisfactory plasticizers for vinyl halides because of their incompatibility or high melting points.

I have discovered that esters, ketones, and ethers containing a tetrahydrofurfuryl group attached directly to the determining group are excellent plasticizers for polyvinyl halides. By the term "determining group" as used herein is meant the group which determines the character of the compound. Thus, in an ester, the group

is the determining group. In a ketone, the carbonyl group is the determining group, while in an ether, the oxygen or sulfur is the determining group. The preferred plasticizers are the high-boiling esters, ketones, or ethers which are liquid at room temperatures. The plasticizing power of the tetrahydrofurfuryl compounds is so great, however, that even solids are capable of producing plasticized compositions. It is preferred, however, to liquefy the solids before use, either by mixing with another solid plasticizer which lowers the melting point of the mixture or by using the solid plasticizer in conjunction with liquid plasticizers.

The plasticizer may be incorporated in the composition by any of the well known methods. For instance, the plasticizer may be added to the composition on a heated roll-mill, or the mixing may be done in an internal mixer. Alternately, the polyvinyl halide may be dissolved in the plasticizer at elevated temperatures. I usually combine from one-half to four parts by weight of plasticizer with one part of polyvinyl halide, though in some instances greater or less amounts may be used. Thus, a resilient composition having remarkable flexibility at low temperatures may be prepared by homogenizing gamma polyvinyl chloride 57 parts by weight and the tetrahydrofurfuryl ester of a dibasic acid such as tetrahydrofurfuryl adipate 43 parts, and heating the resulting composition in a press for 20 minutes at 287° F. Even when cooled to —45° C., this composition will not crack when it is bent, while ordinary plasticized compositions are noticeably stiffened at 0° C. Other compositions having equally good-low-temperature flexibility are obtained by plasticizing gamma polyvinyl chloride wtih tetrahydrofurfuryl succinate and tetrahydrofurfuryl sebacate.

Although polyvinyl halide compositions in general have good resistance to petroleum hydrocarbons, compositions plasticized with ordinary materials such as tricresyl phosphate grow slightly stiffer and shrink slightly in the continued presence of oils. Though this is often advantageous, in some cases the shrinkage is undesirable. When a composition plasticized with tetrahydrofurfuryl phthalate is submerged in oil, the extraction of plasticizers, even if the contact is continued for long periods, is negligible.

Resilient compositions having desirable properties may also be prepared from the esters of other dibasic acids such as tetrahydrofurfuryl malate, maleate, oxalate, malonate, etc.

Polyvinyl halide compositions have a tendency to become discolored upon exposure to high temperatures or prolonged exposure to light. I have discovered that heat- and light-stable compositions may be prepared by using certain tetrahydrofurfuryl esters of monobasic acids as stabilizers. Thus, a composition containing gamma polyvinyl chloride 57 parts by weight and tetrahydrofurfuryl laurate 43 parts remains water white even after heating in a press for 20 minutes at 297° F. A similar composition containing an ordinary plasticizer such as tricresyl phosphate is a dark red or brown color after having been subjected to a similar treatment. If desired, tetrahydrofurfuryl laurate may be incorporated in a composition in small amounts in conjunction with another plasticizer and still retain some of its beneficial stabilizing effect. Thus, a composition containing gamma polyvinyl chloride 57 parts by weight, tetrahydrofurfuryl laurate 5 parts, and tricresyl phosphate 38 parts possesses greater heat and light stability than a composition plasticized with only tricresyl phosphate.

Other plasticizers which are esters of monobasic acids include tetrahydrofurfuryl oleate, palmitate, butyrate, acetyl-ricinoleate, salicylate, caproate, lactate, benzoate, meta-nitro-benzoate, and furoate.

Plasticizers may also be obtained from tetrahydrofuroic acid by esterifying the same. Thus, the benzyl, cyclohexyl, butyl, amyl, phenyl, and tolyl tetrahydrofuroates may be used as plasticizers. Other plasticizers may be obtained by esterifying tetrahydrofuroic acid with polyhydric alcohols such as glycerine, glycol, and dialcohol ethers such as diethylene glycol and 2,2'-dihydroxyethyl thioether.

Although the esters are the preferred plasticizers of this invention, the ethers and ketones are satisfactory plasticizers which may be employed in the same manner as the esters were employed in the specific examples. Typical ketone plasticizers may be represented by the general formula

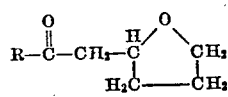

where R is an organic radical. Typical examples include the compounds where R represents amyl, allyl, phenyl, benzyl, cyclohexyl, beta-naphthyl or tetrahydrofurfuryl groups. The ether plasticizers containing a single ether linkage on the tetrahydrofurfuryl group may be represented by the general formula

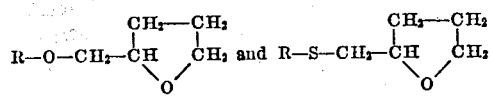

wherein R is, as above, an organic radical. One particularly valuable class of ether plasticizers are the acetals and similar reaction products of alcohols and tetrahydrofurfural containing two ether linkages on the tetrahydrofurfurylidene group.

It is to be understood that the compositions of this invention may contain carbon black, zinc oxide, barytes, clay, wood flour and other pigments and fillers commonly used in the rubber and plastics industries, triethanolamine, metallic silicates, and other stabilizers, and that other plasticizers may be used in connection with the plasticizers of this invention.

Although I have herein disclosed specific embodiments of my invention, I do not intend to limit myself solely thereto, for it is obvious that many modifications including substituting equivalent materials and varying the proportions of materials used are within the spirit and scope of the invention as defined in the appended claims.

I claim:

1. A polyvinyl halide composition containing a member of the class consisting of esters, and ethers containing a tetrahydrofurfuryl group attached directly to the determining group.

2. A gamma polyvinyl chloride composition containing a member of the class consisting of esters, and ethers containing a tetrahydrofurfuryl group attached directly to the determining group.

3. A plasticized composition comprising gamma polyvinyl chloride and a liquid member of the class consisting of esters, and ethers containing a tetrahydrofurfuryl group attached directly to the determining group.

4. A plasticized composition comprising gamma polyvinyl chloride and a tetrahydrofurfuryl ester of a carboxylic acid.

5. A plasticized composition comprising gamma polyvinyl chloride and a tetrahydrofurfuryl ester of a dicarboxylic acid.

6. A plasticized composition comprising gamma polyvinyl chloride and tetrahydrofurfuryl phthalate.

7. A plasticized composition comprising gamma polyvinyl chloride and tetrahydrofurfuryl adipate.

8. A plasticized composition comprising gamma polyvinyl chloride and tetrahydrofurfuryl ester of a monocarboxylic acid.

9. A plasticized composition comprising gamma polyvinyl chloride and a tetrahydrofurfuryl ester of a fatty acid.

10. A plasticized composition comprising gamma polyvinyl chloride and tetrahydrofurfuryl laurate.

CLAUDE H. ALEXANDER.